United States Patent [19]

Vlasak

[11] Patent Number: 4,691,312
[45] Date of Patent: Sep. 1, 1987

[54] DATA TRANSMISSION SYSTEM

[75] Inventor: Weldon R. H. Vlasak, Van Nuys, Calif.

[73] Assignee: ITT Gilfillan, a division of ITT Corporation, Van Nuys, Calif.

[21] Appl. No.: 639,635

[22] Filed: Aug. 10, 1984

[51] Int. Cl.[4] .......................... H04J 3/00; H04B 9/00
[52] U.S. Cl. ....................................... 370/4; 455/617
[58] Field of Search .................. 455/600, 617; 370/1, 370/4; 358/146, 209, 258

[56] References Cited

U.S. PATENT DOCUMENTS

| 2,185,693 | 1/1940 | Mertz | 358/146 |
| 2,191,565 | 2/1940 | Henroteau | 358/146 |
| 2,405,252 | 8/1946 | Goldsmith | 358/258 |
| 2,941,074 | 6/1960 | Poole | 358/142 |
| 3,179,745 | 4/1965 | Stone | 358/258 |
| 4,404,594 | 9/1983 | Hannan | 358/209 |
| 4,549,313 | 10/1985 | Rosenwaig | 455/600 |

FOREIGN PATENT DOCUMENTS 1226275 3/1971 United Kingdom ................... 370/3

OTHER PUBLICATIONS

Boyd et al.-"Optical Channel Waveguide"-SPIE, vol. 176, Guided Wave Optical Systems & Devices, 11, 1979, pp. 141-147.
White-"Optical Modulation"-BSTJ, vol. 50, No. 8, Oct. 1971, pp. 2607-2642.
Kliot-Dashinskii-"Frequency Transformation"-Optical I Spektrosic (USSR) vol. 26, No. 6, pp. 993-999.
Tomlinson et al.-"Optical Multiplexer"-IEEE Jour. of Quantum Electronics, QE-13, No. 9, Sep. 1971, pp. 90-91.
Integrated Optoelectronic Silicon Devices for Optical Signal Processing and Communications; J. T. Boyd; Optical Engineering.

Primary Examiner—Joseph A. Orsino, Jr.
Attorney, Agent, or Firm—Robert A. Walsh; Mary C. Werner

[57] ABSTRACT

A system for sampling data, converting the same to light, and transmitting the light to a remote receiver via an optical fiber. A demultiplexer is provided at the remote end of the optical fiber.

4 Claims, 4 Drawing Figures

:::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::::

DATA TRANSMISSION SYSTEM

BACKGROUND OF THE INVENTION

This invention relates to the transmission of signals over optical fibers, and more particularly to multiplex and to demultiplex transmission systems.

1. Prior Art Statement

It is a known process to multiplex information to be sent over a radar data link. However, this system is very costly and complex for a large number of signals. A large number of components are required so that size and weight are also a factor.

2. Summary of the Invention

In accordance with the present invention a multiplex/demultiplex system is provided to transmit data over an optical fiber.

BRIEF DESCRIPTION OF THE DRAWINGS

In the accompanying drawings which illustrate exemplary embodiments of the present invention.

DESCRIPTION OF THE PREFERRED EMBODIMENT

Figure 1:
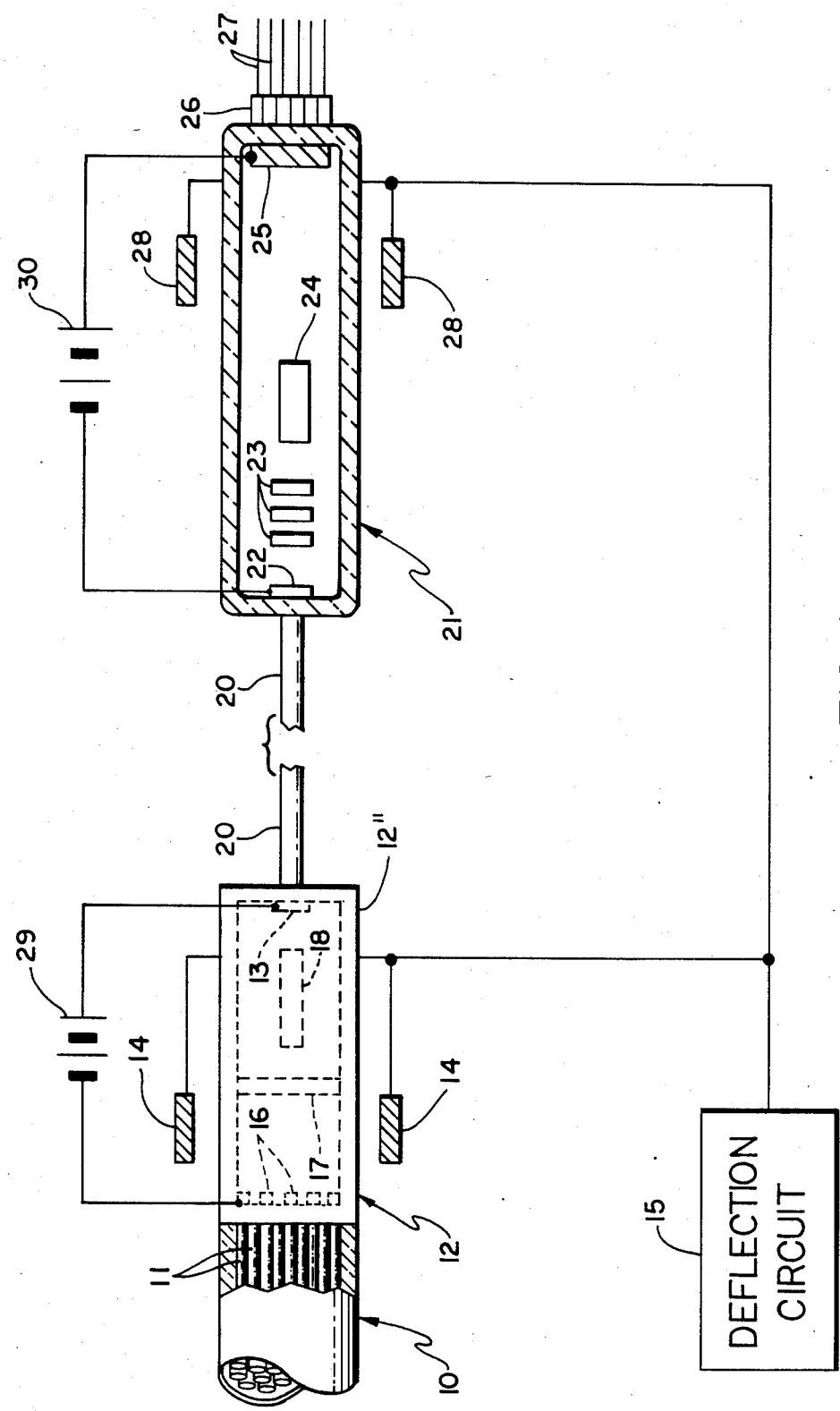
FIG. 1 is a diagrammatic view of a multiplex/demultiplex system of the present invention.

In FIG. 1 a multiplex/demultiplex (MUX/DEMUX) system is shown including a fiber optic cable 10 with optical fibers 11 carrying different respective signals.

An electron tube 12 with a glass envelope 12" is provided similar to an image dissector except for a phosphor layer 13. Tube 12 has four electromagnetic deflection coils 14 connected from a deflection circuit 15.

Tube 12 has a set of photocathode elements 16 for the optical fibers 11. Tube 12 has an image dissector plate 17 and a focusing anode 18.

Figure 2:
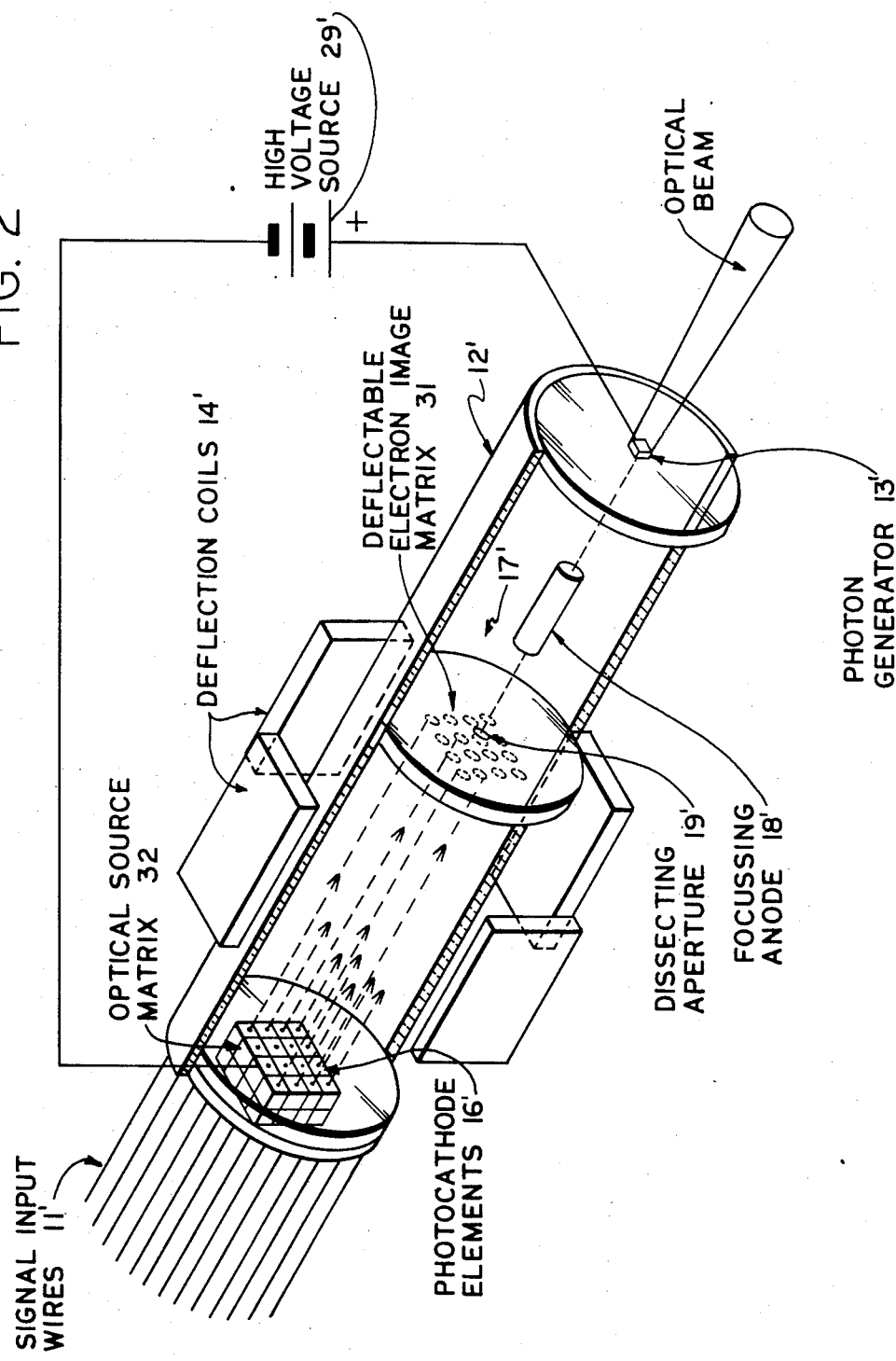
FIG. 2 is a perspective view of an alternative multiplexing electron tube.

Image dissector plate 17 has an aperture (19' in FIG. 2). A phosphor layer 13' is provided which is a photon generator.

An optical fiber 20 is connected from tube 12 to a demultiplexing electron tube 21. Tube 21 has an envelope 21". Tube 21 has a photocathode 22, photomultiplier elements 23, a focusing anode 24, a phosphor screen 25 and a photodetector array 26. Signal output wires 27 are connected from array 26.

Tube 21 has four electromagnetic deflection coils 28 driven in synchronism with coils 14 by deflection circuit 15.

A source of high voltage is connected from photocathode to phosphor both at 29 and 30 in FIG. 1.

The multiplexer of FIG. 2 is similar to that shown in FIG. 1. A deflectable electron image matrix is shown at 31. Tube 12' has signal input wires 11' instead of fibers 11. An optical source matrix 32 supplies light to photocathode elements 16'.

Figure 3:
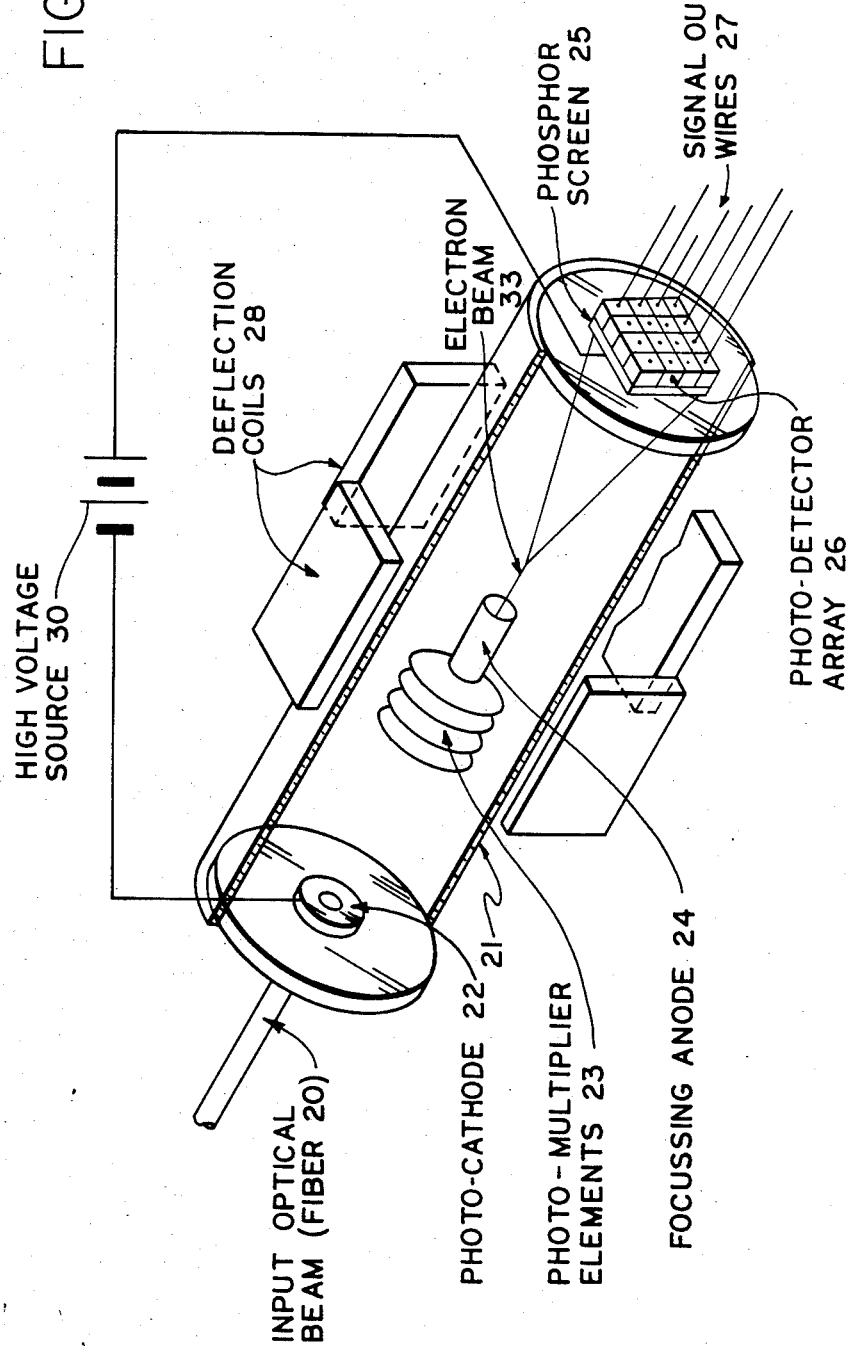
FIG. 3 is a perspective view of a demultiplexing electron tube.

Tube 21 is shown in both FIG. 1 and in FIG. 3. Only 16 channels are shown in FIG. 3. The input light beam is directed onto photo-cathode 22 which generates electrons. The light beam arrives via optical fiber 20. The electrons are accelerated by an electric field and the signals are amplified in photomultiplier 23. Focussing anode 24 condenses the beam which is then guided by the deflection coils 28 such that an electron image matrix is formed at phosphor screen 25. The resulting optical image is similar to that of the source image at the multiplexer and is superimposed onto light detector array 26. In this manner the individual demultiplexed signals appear on the individual output signal wires 27.

Figure 4:
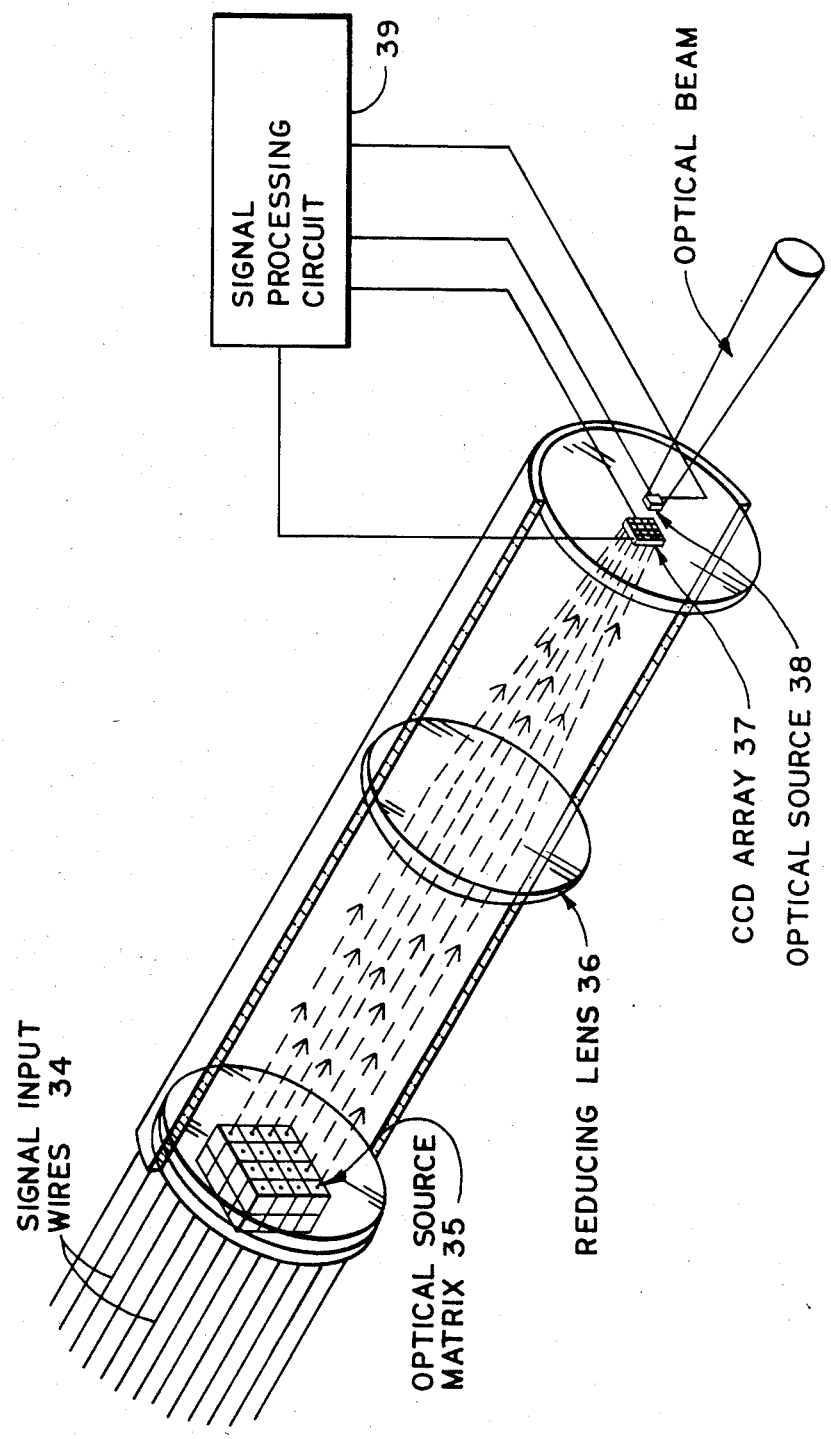
FIG. 4 is an alternative embodiment of the multiplexer of the present invention.

In FIG. 4, signal input wires are shown at 34. An optical source matrix is shown at 35. A reducing lens is shown at 36. A conventional charge coupled device (CCD) array is shown at 37. An optical (light) source is shown at 38. A signal processing circuit 39 scans array 37 and causes source 38 to produce a light beam accordingly.

SUMMARY

There are many instances in which it is required that a number of signals be transmitted over a common transmission path. A system utilized for such purposes in accordance with the present invention utilizes multiplexing of the various signals at the transmitter and demultiplexing at the receiver such that accurate transmission of simultaneous signals occurs with negligible crosstalk. The invention may employ one of a number of known modulation schemes, including frequency modulation, phase modulation, delta modulation, pulse-code modulation, time sampling, and others. The inventive method that is utilized herein is called time division multiplexing, and it utilizes time sampling. For purposes of illustration, a typical radar data transmission link is described, although there are many other types of transmission systems in which the present invention can be used.

A typical contemporary radar data link includes a full duplex system wherein signals can be transmitted in both directions simultaneously on two glass fibers. To describe the system of the present invention, transmission need be observed in only one direction. Various radar signals are applied to a multiplexer. Time division multiplexing is achieved by means of electronic switches such that each channel is individually sampled consecutively, and the aggregate signal then modulates a light beam (optical emitter) which is coupled to a glass fiber for transmission to the receiver. At the receiver, the optical signal is detected (converted to an electrical signal), amplified, and then applied to a demultiplexer which separates the various signals into their original condition. In some cases an optical signal may be amplified prior to detection.

A single device is desired wherein a large number of input signals are multiplexed onto a single optical output (using time division multiplex). This is accomplished using a special combination of optical sources and an image dissector. An optical image is first formed by arranging a matrix of the optical source signals. This matrix is then directly coupled to the photocathode of an image dissector. The image dissector then "dissects" this image into the individual matrix components in a time-serial manner thus achieving time division multiplexing. The movement of the electron cloud image is achieved by means of an electromagnetic (or electric) field and, since the electron inertia is very low, fast modulation rates can be achieved. By designing all components into a single structure, a single device achieves the desired multiplexer operation with a large number of signal input wires and a single optical output.

A single device is desired that has a single optical input time division multiplexed signal with the demultiplexer driving a large number of parallel output signals. It is highly desirable in some cases that this device include signal amplification to make up for signal conversion and path losses. This can all be done in a single device that has similarities to a cathode ray tube and photomultiplier. Input optical signals are first directed to a photomultiplier that simplifies the signals. The resulting electron beam is then imaged into a matrix by a deflection coil as in an image intensifier. The matrix image is then projected onto a phosphor screen such that the original image at the transmitter is reproduced. Time synchronization of the sweep signals at transmitter and receiver is necessary to accomplish this. Synchronization signals can be sent through one of the signal channels (not shown), if desired. The phosphor serves to integrate or smooth the output signals which minimizes external processing. For very fast signals, other material (i.e. GaAs) must be used to generate the electrical outputs. As with the multiplexer, the demultiplexer is contained within a single structure which, in this case, has a single optical input and many parallel signal outputs.

For purposes of simplicity, only 16 channels are shown in FIG. 2. The 16 signal input wires drive an array of 16 optical light sources (Led's or other devices) which are closely coupled to a similar geometry of photocathode matrix elements. Note that these elements are of smaller size and centered within the matrix squares so as to minimize optical coupling caused by bi-fringing electron beam spreading effects. The deflection coils of the image dissector portion of the device select (or multiplex) the desired electron beam of the image matrix through the dissecting aperture. The selected beam exits the aperture and is focused into a narrow beam that is directed onto an optical light source (photon generator). Thus a time division multiplexed optical beam exits from the device. Because the electron beam has low inertia, fast multiplexing can be obtained. While a 4×4 array is shown for simplicity, a 100×100 array will produce a direct 10,000/1 or a 1000×1000 array will produce a 1,000,000/1 multiplex ratio in a single device. It may prove advantageous in some applications to use a separate (external) light source as this will minimize focus beamwidth requirements. As an option, the light source plate could be replaced with a glass fiber array for fiber optic multiplexing.

In FIG. 4, an optical light source matrix is driven by the various signal inputs as in the system of FIG. 2. However, in this case the optical matrix is focused by a reducing lens onto a CCD array which provides a multiplexer serial output to drive a light source. This system requires 5 components as compared to one in the previous case.

A descriptive sketch of the demultiplexer device is diagrammed in FIG. 3. Again, for purposes of simplicity only 16 channels are shown. The input light beam is directed onto a photocathode which generates electrons. The electrons are accelerated by an electric field and the signals are amplified in a photomultiplier. A focusing anode condenses the beam which is then guided by the deflection coils such that an electron image matrix is formed at a phosphor screen as in a cathode ray tube. The resulting optical image is similar to that of the source image at the multiplexer and is superimposed onto a light detector array. In this manner the individual demultiplexer signals appear on the individual output signal wires. As an option, the light detector array could be replaced with a glass fiber array for fiber optic multiplexing.

The example used is a radar fiber optic data link (FODL). Since a high percentage of the cost is involved in the multiplex/demultiplex equipment, significant savings in cost, complexity, size, and weight can result from implementation of the scheme described herein.

Various command, control, and communications signals must be transmitted in certain systems which present similar multiplexing problems for a FODL.

In CO (Central Office) switching systems, multiplexing of telephone signals is a major cost factor and telephone systems constitute a significant market for devices described herein.

Integrated communication systems for cities of the future are past the planning stage and into prototype building. In such cities, various communications will take place via fiber optic cable, and the options for direct fiber optic multiplexing described herein have potential in those applications.

The following relate to the multiplex art:

"*Multiplexed Optical Communication System*"

British Pat. No. 1,226,275 describes a converging fiber type light guide, to one end of which are applied modulated coherent light beams. Appropriate devices are located at the other end of the guide to take off the beams.

"*Optical Channel Waveguide Arrays Coupled to Integrated Charge Coupled Devices and Their Applications*"

Published by J. T. Boyd and D. A. Ramey in "Proceedings of the Society of Photo-optical Instrumentation Engineers," Volume 176, dated 17–18 Apr. 1979, pages 141 to 147. This paper describes a fanout channel waveguide array for integrated optical wave guide lenses.

"*Optical Multiplexer for Multimode Fiber Transmission Systems*"

Published in IEEE Journal of Quantum Electronics, Volume QE-13, No. 9, dated September 1977, pages 90–91, by W. J. Tomlinson and G. D. Aumiller of Bell Laboratories. Fiber collimation is achieved by means of GRIN (Graded Refractive Index Lens) to a grating which is focused on multi-fibers.

"*Frequency Transformation of a Modulated Carrier by Means of an Optical Solid-State Quantum Amplifier*"

Published in Optical I Spektrosic (USSR), Volume 26, No. 6, pages 993 to 999, dated June 1969, by M. I. Kliot-Dashinskii. English translation in Optics and Spectroscopy (USA), Volume 26, No. 6, pages 538 to 541, June 1969. Frequency transformation of an amplitude modulated carrier is achieved in a solid state, one wave, travelling wave amplifier with two active transitions from a common upper level.

"*Optical Modulation at High Information Rates*"

Published in the Bell System Technical Journal, Volume 50, No. 8, page 2607 to 2645, October 1972, by G. White. This article describes a wideband modulation method for a gas laser using a travelling wave tube.

What is claimed is:

1. A data transmission system comprising: an image dissector-like tube having a first photocathode comprising an array of photocathode elements, first deflection means, a dissector disc, and a phosphor layer producing a light output; optical source matrix means including a cable of wires, said optical source matrix means including a plurality of light emitting elements being positioned adjacent said first photocathode with each of said wires attached to a separate one of said light emitting elements the light output of the light emitting elements illuminating corresponding photocathode elements; the output of said array being directed at said dissector disc and said deflection means being positioned to control the direction of the output of said array, and means for focusing the output of said array through said dissector disc onto said phosphor layer; and optical fiber having an input end positioned to receive said light output of said phosphor layer and an output end; and demultiplex means at said output end of said optical fiber to demultiplex the light signals corresponding to said light output emanating therefrom.

2. The invention as defined in claim 1, wherein said demultiplex means includes an electron tube having a second photocathode to receive said light signals, electron multiplier means to multiply electrons emanating from said second photocathode; second deflection means for deflecting electrons produced by said multiplier; a phosphor screen to receive said electrons; a photodetector array having a plurality of output leads connected therefrom; and a deflection circuit to operate said first and second deflection means in synchronism.

3. A data transmission system comprising: a wire cable; an optical source matrix to produce outputs corresponding to the outputs of said cable; a charge coupled device array; a reducing lens to focus the outputs of said optical source matrix onto said charge coupled device array; a signal processing circuit to scan said charge coupled device array; an optical source to be actuated by said charge coupled device array; an optical fiber having an input end positioned to receive the light output of said optical source; and demultiplex means at the ouput of said optical fiber to demultiplex light emanating therefrom.

4. The invention as defined in claim 3, wherein said demultiplex means includes an electron tube having a photocathode to receive said light signals, electron multiplier means to multiply electrons emanating from said photocathode, deflection means, a phosphor screen, a photodetector array having a plurality of output leads connected therefrom each associated with one element of said photodetector array, said deflection means being positioned to deflect the output of said electron multiplier means to form an electron image matrix on said phosphor screen, said phosophor screen being positioned adjacent said photodetector array the photodetector array converting the intensity of the phosphor screen output at each element of said photodetector array to electrons for transmission over each element's associated output lead, and means to operate said circuit and said deflection means in synchronism.

* * * * *